United States Patent
Orlowski et al.

(10) Patent No.: US 7,631,878 B1
(45) Date of Patent: *Dec. 15, 2009

(54) SHAFT SEAL ASSEMBLY

(75) Inventors: David C. Orlowski, Punta Gorda, FL (US); Neil F. Hoelhe, Solon, IA (US)

(73) Assignee: Isotech of Illinois, Inc., Rock Island, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/156,476

(22) Filed: May 30, 2008

Related U.S. Application Data

(63) Continuation of application No. 11/405,207, filed on Apr. 17, 2006, now Pat. No. 7,396,017.

(60) Provisional application No. 60/697,434, filed on Jul. 9, 2005.

(51) Int. Cl.
*F16J 15/447* (2006.01)
*F16C 23/04* (2006.01)

(52) U.S. Cl. .................. 277/413; 277/417; 277/419; 277/421; 384/192

(58) Field of Classification Search ......... 277/412–413, 277/417, 419–422, 431–432; 384/192–214
See application file for complete search history.

(56) References Cited

U.S. PATENT DOCUMENTS

| 3,243,212 | A | * | 3/1966 | May | 403/38 |
| 4,305,592 | A | * | 12/1981 | Peterson | 277/430 |
| 5,799,950 | A | * | 9/1998 | Allen et al. | 277/628 |
| 6,004,037 | A | * | 12/1999 | Harris et al. | 384/206 |

* cited by examiner

*Primary Examiner*—Vishal Patel
(74) *Attorney, Agent, or Firm*—Hamilton IP Law, PC; Jay R. Hamilton; Charles A. Damschen

(57) ABSTRACT

A shaft seal assembly for maintaining a seal during shaft misalignment comprising a first sealing means adjacent said shaft with a defined clearance between said shaft and said sealing means, said shaft moveable axially in relation to said first sealing means; a second sealing means, said first sealing means partially encompassed within second sealing means and in cooperative communication with said second sealing means; a third sealing means, said second sealing means partially encompassed within third sealing means and in cooperative communication with said third sealing means, said third sealing means attached to said housing or vessel and allowing said first sealing means and second sealing means to cooperatively respond to said forces produced by angular misalignment of said shaft during rotation of said shaft while maintaining defined clearance between said shaft and said sealing means.

24 Claims, 9 Drawing Sheets

SHAFT SEAL ASSEMBLY

Applicant states that this utility patent application claims priority from U.S. patent application Ser. No. 11/405,207 filed on Apr. 17, 2006 and is a continuation of said utility patent application which claimed priority from both nonprovisional patent application Ser. No. 10/177,067 filed on Jun. 21, 2002 and the provisional patent application filed on Jul. 9, 2005 and given Ser. No. 60/697,434 by the United States Patent and Trademark Office, all of which are incorporated by reference herein.

FIELD OF THE INVENTION

The present invention relates to a shaft seal assembly with multiple embodiments. A labyrinth seal for retaining lubrication solution within the bearing cavity of a hub assembly, such as a bearing housing, for application to a rotatable shaft to keep contaminants out of the bearing cavity is disclosed and claimed. In another embodiment, the shaft seal assembly may be used as a product seal between a product vessel and a shaft therein.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX (Not Applicable)

BACKGROUND OF THE INVENTION

For years there have been a multitude of attempts and ideas for providing a satisfactory seal when a rotatable shaft is angularly misaligned resulting in run out of the shaft. Typically the solutions presented have failed to provide an adequate seal while allowing for an acceptable amount of shaft misalignment during operation. The problem is especially acute in product seals where the potential for shaft to bore misalignment may be maximized. A typical solution in the prior art is to increase the operating clearance between the rotating shaft and sealing members to create a "loose" clearance or operating condition. "Loose" running for adjustment or response to operational conditions, especially misalignment of the shaft with respect to the stator or stationary member, however, typically reduces or lowers the efficiency and efficacy of sealing members.

Labyrinth seals, for example, have been in common use for many years for application to sealing rotatable shafts. A few of the advantages of labyrinth seals over contact seals are increased wear resistance, extended operating life and reduced power consumption during use. Labyrinth seals, however, also depend on a close and defined clearance with the rotatable shaft for proper function. Shaft misalignment is also a problem with "contact" seals because the contact between the seal and misaligned shaft typically results in greater wear. Abrasiveness of the product also affects the wear pattern and the useful life of the contact seals.

Prior attempts to use fluid pressure (either vapor or liquid) to seal both liquid and solid materials in combination with sealing members such as labyrinth seals or contact seals have not been entirely satisfactory because of the "tight" or low clearance necessary to create the required pressure differential between the seal and the product on the other side of the seal (i.e., the tighter the seal, the lower the volume of fluid required to maintain the seal against the external pressure of material.) Another weakness in the prior art is that many product seals expose the movable intermeshed sealing faces or surfaces of the product seal to the product resulting in aggressive wear and poor reliability. Furthermore, for certain applications, the product seal may need to be removed entirely from the shaft seal assembly for cleaning, because of product exposure to the sealing faces or surfaces.

The prior art then has failed to provide a solution that allows both a "tight" running clearance between the seal members and the stationary member for efficacious sealing and a "loose" running clearance for adjustment or response to operational conditions especially misalignment of the rotatable shaft with respect to the stator or stationary member.

SUMMARY OF THE INVENTION

The present art offers improved shaft sealing and product seal performance over the prior art. The shaft seal assembly solution disclosed and claimed herein allows both tight or low running clearance between seal members and the stationary member and a loose running clearance for adjustment or response to operational conditions especially misalignment of a rotatable shaft with respect to the stator or stationary member.

As disclosed herein, the present art describes and provides for improved function by allowing a labyrinth seal to adjust to radial, axial and angular movements of the shaft while maintaining a desired shaft-to-labyrinth clearance. The present art also permits equalization of pressure across the labyrinth pattern by permitting venting and thus improved function over currently available designs. Additionally, sealing fluid (air, steam, gas or liquid) pressure may be applied through the vent or port locations to establish an internal seal pressure greater than inboard or outboard pressure (over-pressurization). This enables the labyrinth to seal pressure differentials that may exist between the inboard and outboard sides of the seal. Pressurization of the internal portion of the shaft seal assembly effectively isolates the moving or engaging faces of the shaft seal assembly from contact with product by design and in combination with a pressurized fluid barrier.

It is therefore an object of the present invention to provide a shaft seal assembly for engagement with a housing which maintains its sealing integrity with a shaft upon application of axial, angular or radial force upon said shaft.

It is another object of the present invention to provide a shaft seal assembly, which may be mounted to a vessel wall for engagement with a shaft which maintains its sealing integrity with a shaft during or in response to axial, angular or radial force movement of said shaft.

Other objects and features of the invention will become apparent from the following detailed description when read with reference to the accompanying drawings.

DETAILED DESCRIPTION

ELEMENT LISTING

| Description | Element No. |
| --- | --- |
| Shaft | 1 |
| Fixed stator | 2 |
| Fixed stator (part-line) | 2a |
| Labyrinth seal | 3 |
| Radiused face | 3a |
| Floating stator | 4 |
| Fluid return pathway | 5 |
| Shaft seal clearance | 6 |
| First o-ring | 7 |
| Anti-rotation pin | 8 |
| Vent | 9 |
| Anti-rotation groove (floating stator) | 10 |
| Spherical interface | 11 |
| Anti-rotation pin | 12 |
| Second o-ring | 13 |
| Labyrinth seal pattern grooves | 14 |
| First o-ring channel | 15 |
| Cavity for anti-rotation device (fixed stator) | 16 |
| Axial face of labyrinth seal | 17 |
| Axial face of floating stator | 18 |
| Second o-ring channel | 19 |
| First clearance between floating stator/fixed stator | 20 |
| Second clearance between floating stator/fixed stator | 21 |
| Throttle groove | 22 |
| Labyrinth pattern annular groove | 23 |
| Sleeve | 24 |
| Shaft seal assembly | 25 |
| Throttle (alignment skate) | 26 |
| Floating stator annular groove | 27 |
| Labyrinth seal passage | 28 |
| Floating stator passage | 29 |
| Housing | 30 |
| Angle of misalignment | 31 |
| Bearings and bearing cavity | 32 |
| Mounting bolts | 33 |
| Vessel wall | 34 |

DETAILED DESCRIPTION

Figure 4:
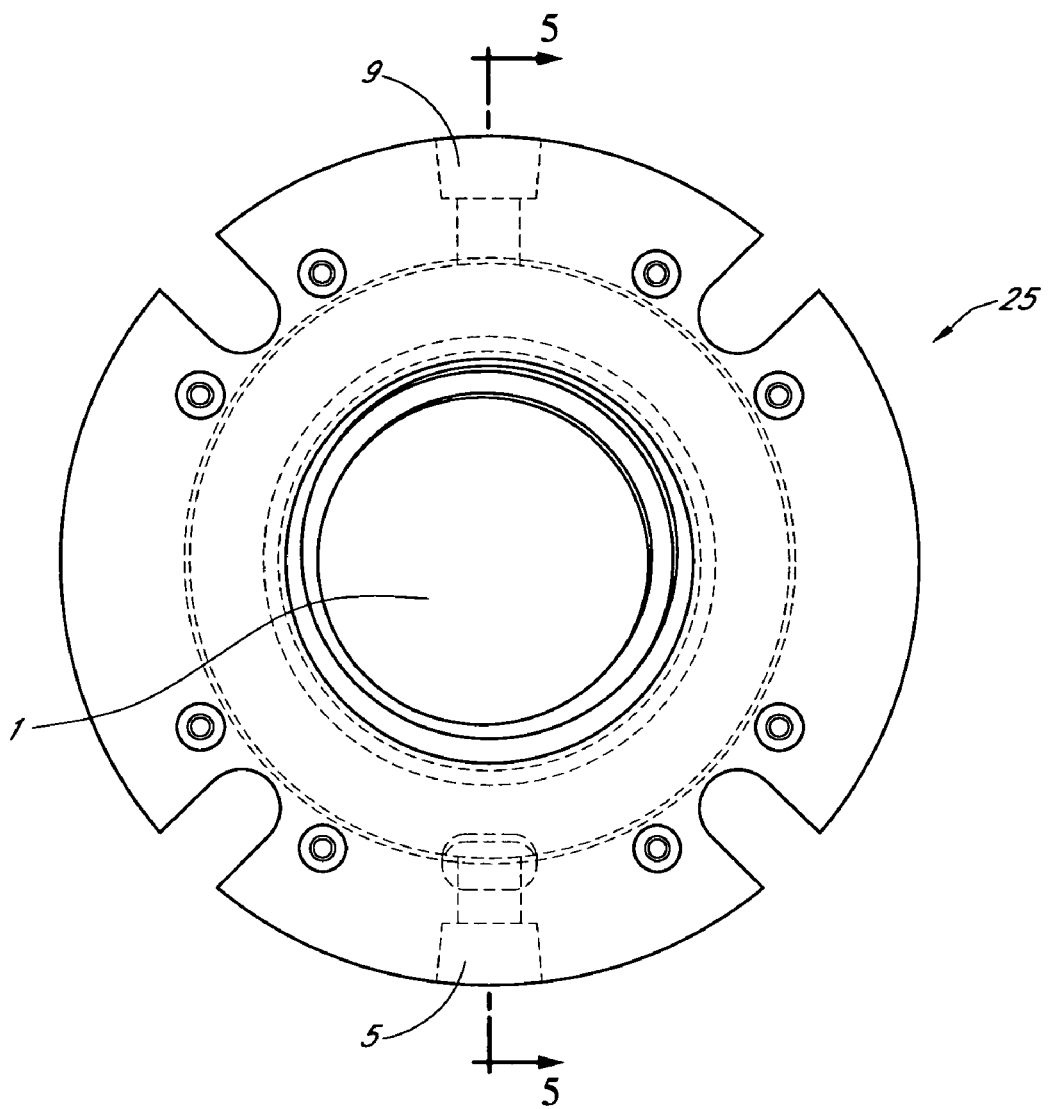
FIG. 4 is an exterior end view with the shaft misaligned.
Figure 5:
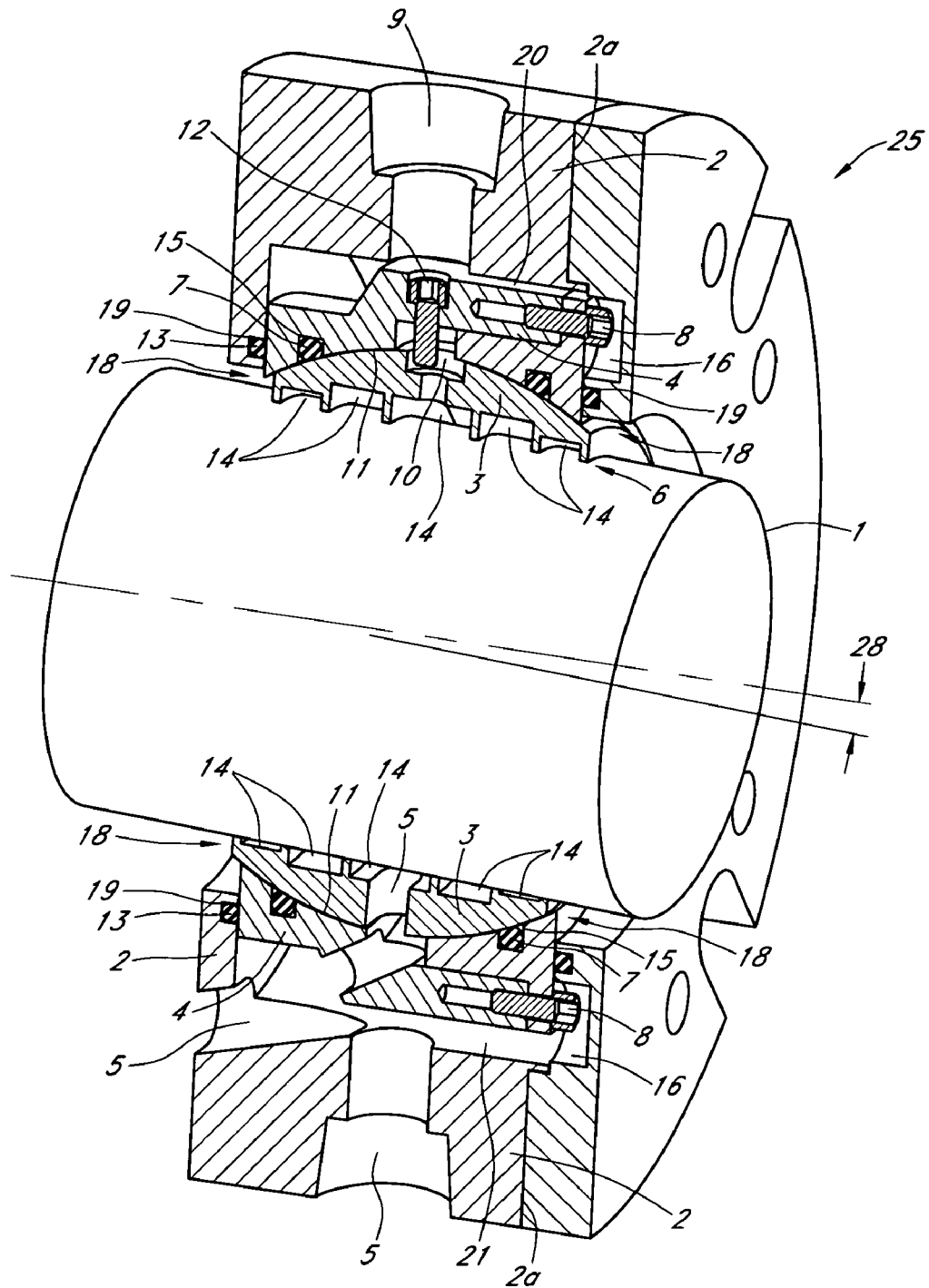
FIG. 5 is a sectional view of the first embodiment as shown in FIG. 3 with both angular and radial misalignment of the shaft applied.
Figure 6:
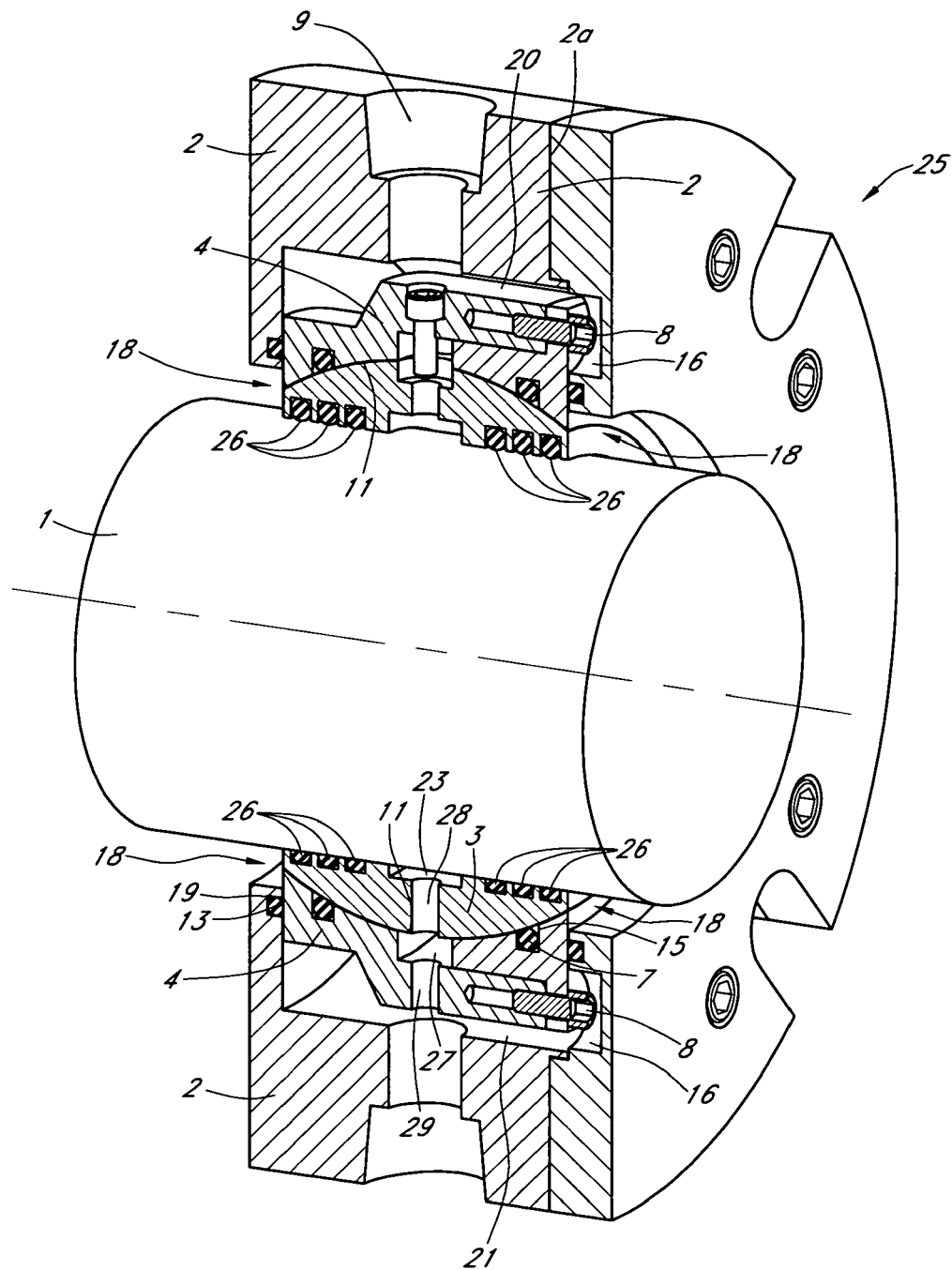
FIG. 6 is a sectional view of a second embodiment of the shaft seal assembly as shown in FIG. 2.
Figure 7:
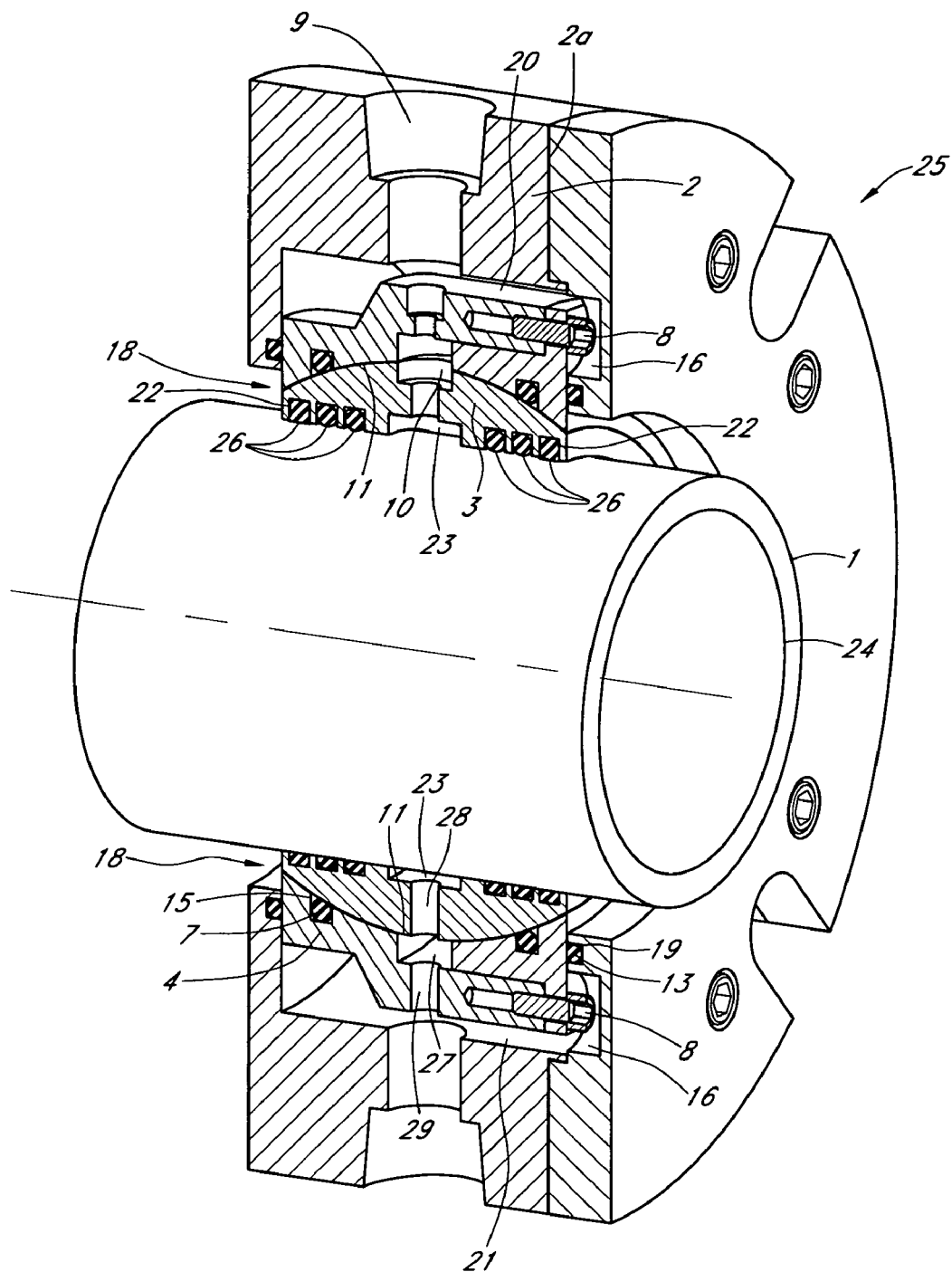
FIG. 7 is a sectional view of a third embodiment as shown in FIG. 2.

FIGS. 1-5 provide a view of a first embodiment of the shaft seal assembly 25 that allows for sealing various lubricating solutions within bearing housing 30. FIGS. 6 and 7 provide alternative embodiments of the shaft seal assembly 25 wherein sealing fluids are used. Applicant herein defines sealing fluids to include both liquids and vapors. Applicant considers air, nitrogen, water and steam as well as any other fluid which may work with the proposed shaft seal assembly to provide a pressurized fluid barrier for any and all embodiments disclosed herein to be within the purview of the present disclosure. The gas or fluid chosen is based on process suitability with the product to be sealed.

Figure 2:
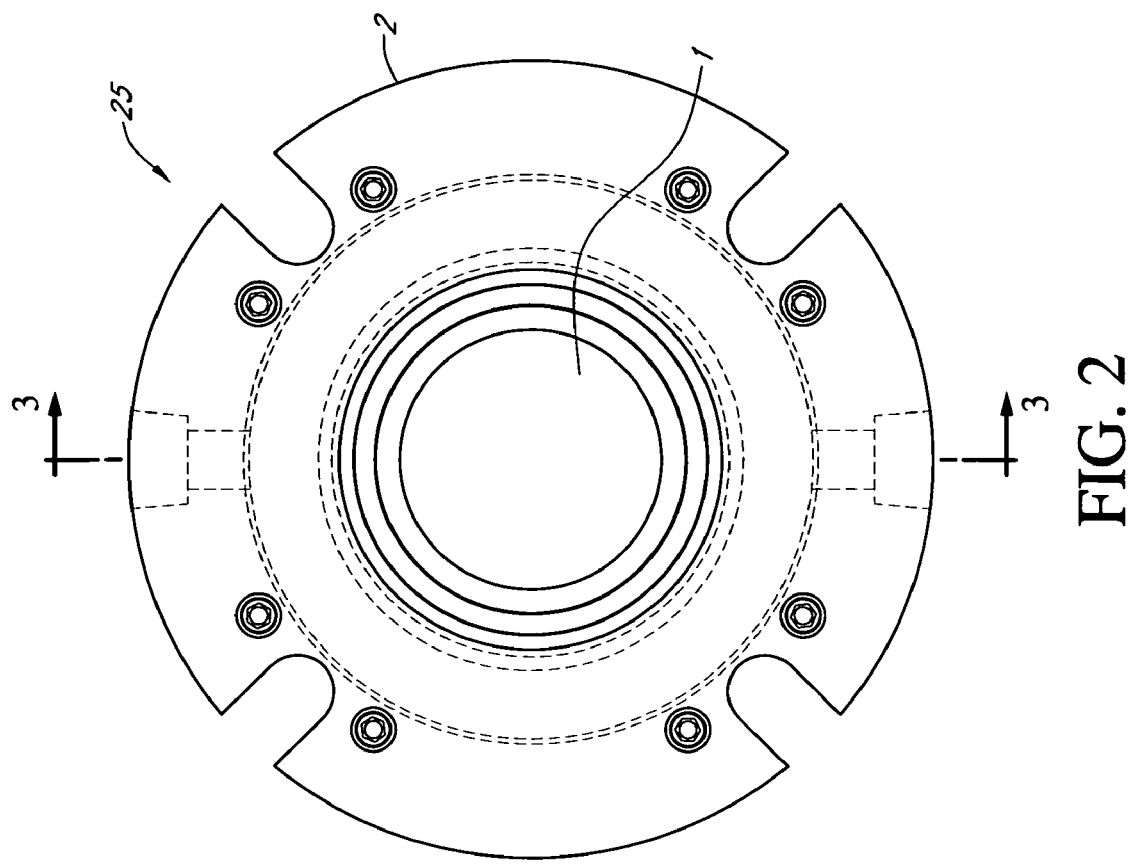
FIG. 2 is an exterior end view of the shaft seal assembly with the shaft element aligned.
Figure 1:
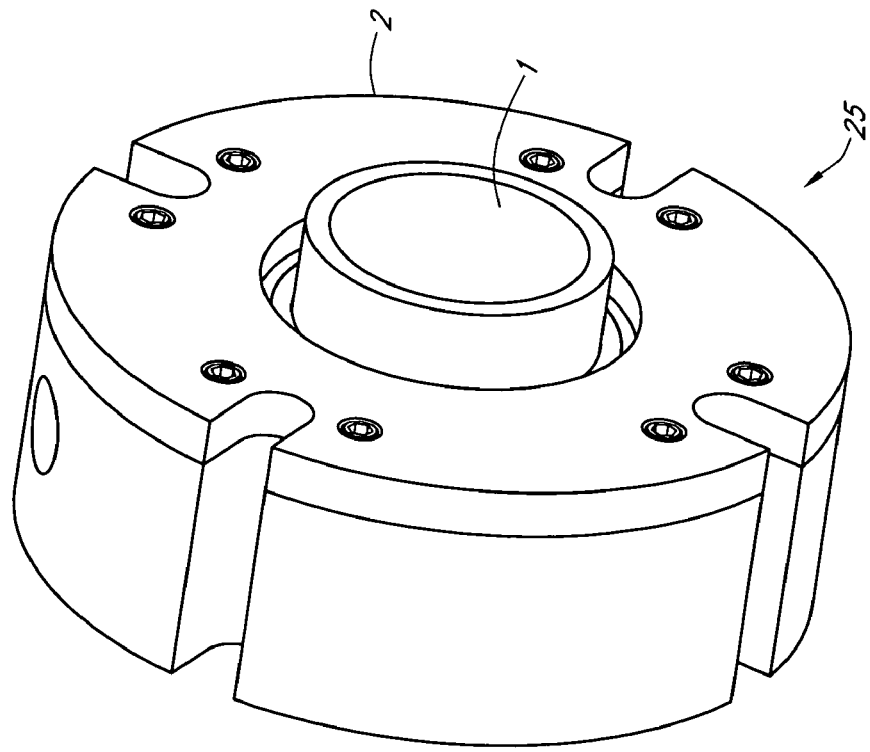
FIG. 1 is a perspective exterior view of the shaft seal assembly.

FIG. 1 is a perspective exterior view of the shaft seal assembly 25 arranged and engaged with a shaft 1 inserted through the fixed stator 2 of shaft seal assembly 25. FIG. 2 is an exterior end view of the shaft seal assembly with shaft 1 aligned within the shaft seal assembly 25.

Figure 3:
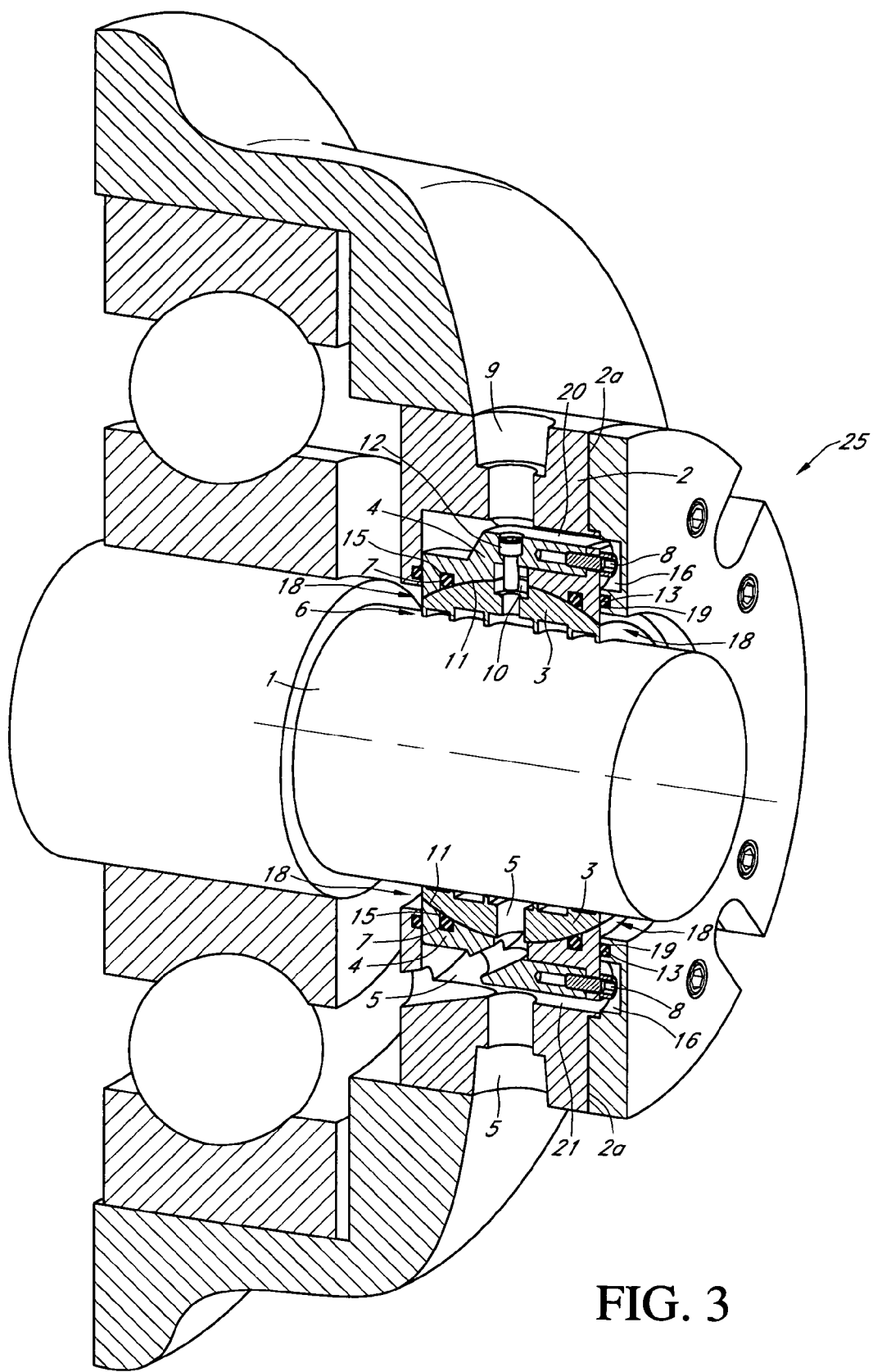
FIG. 3 is a sectional view of a first embodiment of the shaft seal assembly, as shown in FIG. 2 and mounted to a housing.

FIG. 3 is a sectional view of a first embodiment of the shaft seal assembly 25 shown in FIG. 2 illustrating the shaft seal assembly 25 as a labyrinth seal for retaining lubrication solution within the bearing cavity 32 of housing 30. The shaft 1 shown in FIG. 3 is the type which may experience radial, angular or axial movement relative to the fixed stator element or portion of the fixed stator 2 during rotation. The fixed stator portion of the shaft seal assembly 25 may be flange-mounted or press-fit or attached by other means to a housing 30. The invention will also function with a rotating housing and stationary shaft. (Not shown) As required by the particular application, the shaft 1 is allowed to move freely in the axial direction in relation to the shaft seal assembly 25.

A labyrinth seal 3 having an interior surface is engaged with shaft 1. A defined clearance 6 exists between the interior surface of said labyrinth seal 3 and the shaft 1. Opposite the interior surface of said labyrinth seal 3 is the radiused surface 3a of said labyrinth seal 3. The radiused surface 3a of the labyrinth seal 3 and the interior of the floating stator 4 forms a spherical interface 11. O-ring channels 15 and o-rings 7 are disposed to cooperate with said radiused surface 3a of said labyrinth seal 3 to seal (or trap) fluid migration through, between and along engaged labyrinth seal 3 and floating stator 4 while maintaining spherical interface 11 which allows limited relative rotational movement (articulation) between labyrinth seal 3 and floating stator 4. O-ring channels 15, as shown, are machined into the floating stator 4 and positioned at the spherical interface 11 with labyrinth seal 3. O-ring channels 15 are annular and continuous in relation to labyrinth seal 3. The o-ring channel 15 and o-ring 7 may also be placed in the labyrinth seal 3 adjacent the spherical interface 11. O-rings 7 should be made of materials that are compatible with both the product to be sealed and the preferred sealing fluid chosen. O-ring channels 15 and o-rings 7 are one possible combination of sealing means that may be used within the shaft seal assembly 25 as recited in the claims. Strategically placed anti-rotation pin(s) 12 inserted into anti-rotation grooves 10 limit relative rotational movement between labyrinth seal 3 and floating stator 4. A plurality of anti-rotation grooves 10 and pins 12 may be placed around the radius of the shaft 1. If the shaft seal assembly 25 is used in combination with a sealing fluid, strategic anti-rotation pins 12 may be removed allowing corresponding anti-rotation grooves 10 to serve as a fluid passage through vent 9 and lubricant return 5. (See FIG. 7) Additionally, the relationship of the diameters of anti-rotation pins 12 and anti-rotation grooves 10 may be selected to allow more or less angular misalignment of the shaft 1. A small diameter anti-rotation pin 12 used with a large diameter anti-rotation groove 10 would allow for greater relative movement of the labyrinth seal 3 in relation to the floating stator 4 in response to angular misalignment of shaft 1. Labyrinth seal 3 is one possible embodiment of a sealing means that may be used adjacent to the shaft 1 within the shaft seal assembly 25 as recited in the claims.

A continuous annular channel is formed within fixed stator 2 and defined by clearance 20 and 21 as allowed between the exterior of said floating stator 4 and said interior of said fixed stator 2 of shaft seal assembly 25. The annular channel of fixed stator 2 is highlighted as A-A' in FIG. 2. The annular channel of the fixed stator has interior surfaces which are substantially perpendicular to said shaft 1. The exterior surfaces of the floating stator 4, which is substantially encompassed within the annular channel of the fixed stator 2, cooperatively engage with the first and second interior perpendicular faces of the fixed stator 2. An inner annular interface is formed by the first (shaft seal assembly inboard side) perpendicular annular channel surface of the fixed stator 2 engaging with the first (inboard side) perpendicular face of the floating stator 4. An outer annular interface is formed by the second (shaft seal assembly outboard side) perpendicular annular interior channel surface of the fixed stator 2 engaging with the second (outboard side) perpendicular face of the floating stator 4. O-ring channels 19 and o-rings 13 disposed therein cooperate with the surfaces of floating stator 4 which are in perpendicular to relation to shaft 1 to seal (or trap) fluid migration between and along engaged floating stator 4 while allowing limited relative rotational movement between floating stator 4 and fixed stator 2. Floating stator 4 and fixed stator 2 are one possible embodiment of cooperatively engaged sealing means that may be used in combination with labyrinth seal 3 within the shaft seal assembly 25 as recited in the claims.

O-ring channels 19 are annular and continuous in relation to shaft 1. The o-ring channels 19 and o-rings 13 may be placed in the body of the floating stator 4 instead of the fixed stator 2 (not shown) but must be placed in similar proximal relation. O-rings 13 should be made of materials that are compatible with both the product to be sealed and the preferred sealing fluid chosen. O-ring channels 19 and o-rings 13 are one possible combination of sealing means that may be used within the shaft seal assembly 25 as recited in the claims.

Strategically placed anti-rotation pin(s) 8 inserted into anti-rotation groove(s) 16 limit both relative radial and rotational movement between floating stator 4 and interior side of fixed stator 2. A plurality of anti-rotation grooves 16 and pins 8 may be placed around the radius of the shaft 1. The relationship of the diameters of anti-rotation pins 8 and anti-rotation grooves 16 may also be selected to allow more or less angular misalignment of the shaft. A small diameter anti-rotation pin 8 and large diameter fixed stator anti-rotation groove allow for greater relative movement of the labyrinth seal 3 in response to angular misalignment of shaft 1.

The labyrinth pattern seal grooves 14 may be pressure equalized by venting through one or more vents 9. If so desired, the vents may be supplied with a pressurized sealing fluid to over-pressurize the labyrinth area 14 and shaft seal clearance 6 to increase the efficacy of shaft seal assembly 25. A spherical interface 11 between the labyrinth seal 3 and the floating stator 4 allow for angular misalignment between the shaft 1 and fixed stator 2. O-ring channels 19 are annular with the shaft 1 and, as shown, are machined into the fixed stator 2 and positioned at the interface between the fixed stator 2 and floating stator 4. O-ring channel 19 may also be placed in the floating stator 4 for sealing contact with the fixed stator 2.

Figure 3A:
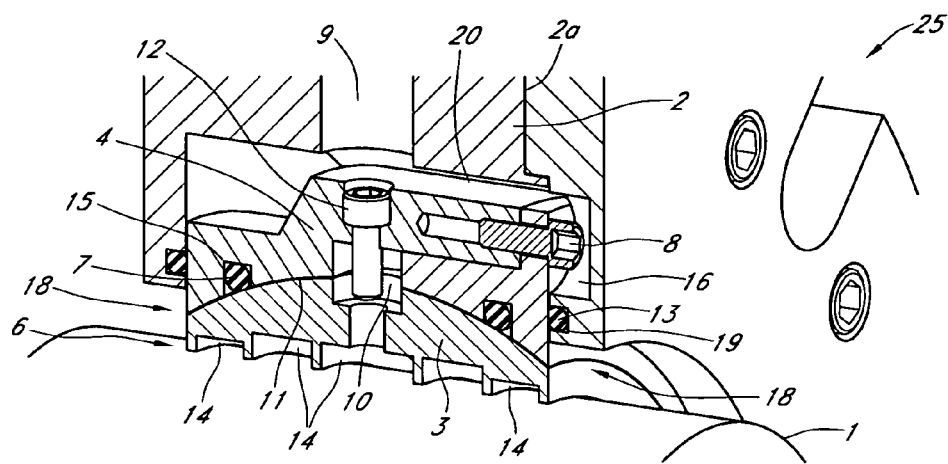
FIG. 3A illustrates the first surface seal-shaft integrity during angular and radial shaft alignment.
Figure 3B:
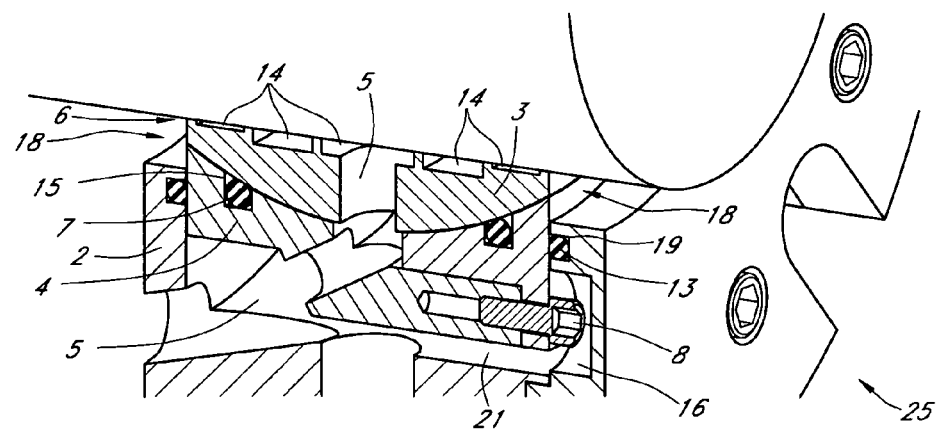
FIG. 3B illustrates second surface seal-shaft integrity during angular and radial shaft alignment.

FIG. 3A illustrates seal-shaft integrity during angular and radial shaft alignment. This view highlights the alignment of the axial face 17 of the labyrinth seal 3 and the axial face 18 of the floating stator 4. Particular focus is drawn to the alignment of the axial faces 17 and 18 at the spherical interface 11 between the floating stator 4 and labyrinth 3. FIG. 3B illustrates the shaft-seal integrity during angular and radial shaft alignment at the surface opposite that shown in FIG. 3A. This view highlights the alignment of the axial faces 17 and 18 of labyrinth seal 3 and floating stator 4, respectively, for the opposite portion of the shaft seal assembly 25 as shown in FIG. 3A. Those practiced in the arts will appreciate that because the shaft 1 and shaft seal assembly 25 are of a circular shape and nature, the surfaces are shown 360 degrees around shaft 1. Again, particular focus is drawn to the alignment of the axial faces 17 and 18 at the spherical interface 11 between the labyrinth seal 3 and floating stator 4. FIGS. 3A and 3B also illustrate the first defined clearance 20 between the floating stator 4 and the fixed stator 2 and the second defined clearance 21 between the floating stator 4 and fixed stator 2 and opposite the first defined clearance 20.

In FIGS. 2, 3, 3A and 3B, the shaft 1 is not experiencing radial, angular or axial movement and the width of the defined clearances 20 and 21, which are substantially equal, indicate little movement or misalignment upon the floating stator 4.

FIG. 4 is an exterior end view of the shaft seal assembly 25 with the rotatable shaft 1 misaligned therein. FIG. 5 is a sectional view of the first embodiment of the shaft seal assembly 25 as shown in FIG. 3 with both angular and radial misalignment of the shaft 1 applied. The shaft 1 as shown in FIG. 5 is also of the type which may experience radial, angular or axial movement relative to the fixed stator 2 portion of the shaft seal assembly 25.

As shown at FIG. 5, the defined radial clearance 6 of labyrinth seal 3 with shaft 1 has been maintained even though the angle of shaft misalignment 31 has changed. The shaft 1 is still allowed to move freely in the axial direction even though the angle of shaft misalignment 31 has changed. The arrangement of the shaft seal assembly 25 allows the labyrinth seal 3 to move with the floating stator 4 upon introduction of radial movement of said shaft 1. The labyrinth seal 3 and floating stator 4 are secured together by one or more compressed o-rings 7. Rotation of the labyrinth seal 3 within the floating stator 4 is prevented by anti-rotation means which may include a screws, pins or similar devices 12 to inhibit rotation. Rotation of the labyrinth seal 3 and floating stator 4 assembly within the fixed stator 2 is prevented by anti-rotation pins 8. The pins as shown in FIGS. 3, 3A, 3B, 5, 6 and 7 are one means of preventing rotation of the labyrinth seal 3 and floating stator 4, as recited in the claims. Lubricant or other media to be sealed by the labyrinth seal 3 may be collected and drained through a series of one or more optional drains or lubricant return pathways 5. The labyrinth seal 3 may be pressure equalized by venting through one or more vents 9. If so desired, the vents 9 may be supplied with pressurized air or other gas or fluid media to over-pressurize the labyrinth seal 3 to increase seal efficacy. The combination of close tolerances between the cooperatively engaged mechanical portions of the shaft seal assembly 25 and pressurized sealing fluid inhibit product and contaminate contact with the internals of the shaft seal assembly 25. The spherical interface 11 between the labyrinth seal 3 and the floating stator 4 allow for angular misalignment between the shaft 1 and fixed stator 2. O-ring channel 19 and o-ring 13 disposed therein cooperate with the opposing faces of the floating stator 4, which are substantially in perpendicular relation to shaft 1, to seal (or trap) fluid migration between and along engaged floating stator 4 while allowing limited relative radial (vertical) movement between stator 4 and fixed stator 2.

Figure 5A:
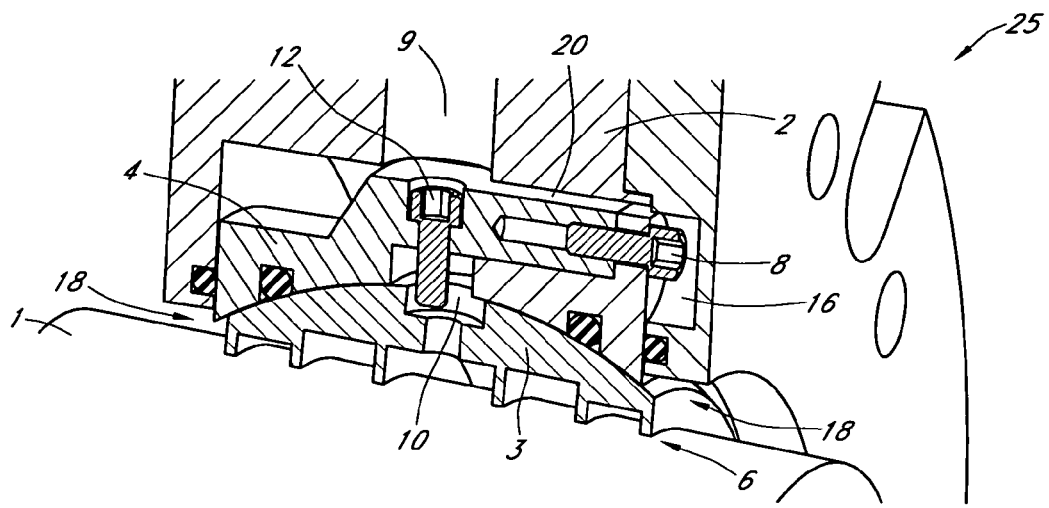
FIG. 5A illustrates first seal-shaft integrity allowed by articulation during angular and radial shaft misalignment.

FIG. 5A illustrates seal-shaft integrity allowed by the shaft seal assembly 25 during angular and radial shaft misalignment. This view highlights the offset or articulation of the axial faces 17 of the labyrinth seal in relation the axial faces 18 of the floating stator 4 for a first portion of the shaft seal assembly 25. Particular focus is drawn to the offset of the axial faces 17 and 18 at the spherical interface 11 between labyrinth seal 3 and floating stator 4.

Figure 5B:
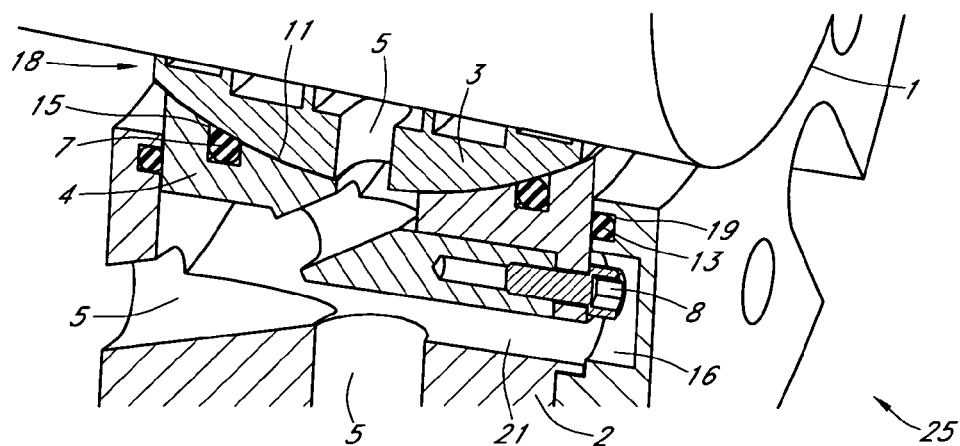
FIG. 5B illustrates second seal-shaft integrity allowed by articulation during angular and radial shaft misalignment.

FIG. 5B illustrates seal-shaft integrity for a second surface, opposite the first surface shown in FIG. 5A, during angular and radial shaft misalignment. This view highlights that during misalignment of shaft 1, axial faces 17 and 18, of the labyrinth seal 3 and floating stator 4, respectively, are not aligned but instead move (articulate) in relation to each other. The shaft to seal clearance 6 is maintained in response to the shaft misalignment and the overall seal integrity is not compromised because the seal integrity of the floating stator 4 to fixed stator 2 and the floating stator 4 to labyrinth seal 3 are maintained during shaft misalignment. Those practiced in the arts will appreciate that because the shaft 1 and shaft seal assembly 25 are of a circular shape and nature, the surfaces are shown 360 degrees around shaft 1.

FIGS. 5A and 5B also illustrate the first clearance or gap 20 between the floating stator 4 and the fixed stator 2 and the second clearance or gap 21 between the floating stator 4 and fixed stator 2 and opposite the first clearance or gap 20.

In FIGS. 4, 5, 5A and 5B, the shaft 1 is experiencing radial, angular or axial movement during rotation of the shaft 1 and the width of the gaps or clearances 20 and 21, have changed in response to said radial, angular or axial movement. (Compare to FIGS. 3, 3A and 3B.) The change in width of clearance 20 and 21 indicate the floating stator 4 has moved in response to the movement or angular misalignment of shaft 1. The shaft seal assembly 25 allows articulation between axial faces 17 and 18, maintenance of spherical interface 11 and radial movement at first and second clearance, 20 and 21, respectively, while maintaining shaft seal clearance 6.

FIG. 6 is a sectional view of a second embodiment of the shaft seal assembly 25 as shown in FIG. 2 for over-pressurization with alternative labyrinth seal pattern grooves 14. In this figure the labyrinth seal pattern grooves 14 are composed of a friction reducing substance such as polytetrafluoroethylene (PTFE) that forms a close clearance to the shaft 1. PTFE is also sometimes referred to as Teflon® which is manufactured and marketed by Dupont. PTFE is a plastic with high chemical resistance, low and high temperature capability, resistance to weathering, low friction, electrical and thermal insulation, and "slipperiness." The "slipperiness" of the material may also be defined as lubricous or adding a lubricous type quality to the material. Carbon or other materials may be substituted for PTFE to provide the necessary sealing qualities and lubricous qualities for labyrinth seal pattern grooves 14.

Pressurized sealing fluids are supplied to over-pressurize the lubricious labyrinth pattern 26 as shown in FIG. 6. The pressurized sealing fluids make their way into the annular groove 23 of the throttle 26 through one or more inlets. Throttle 26 is also referred to as "an alignment skate" by those practiced in the arts. Throttle 26 allows the labyrinth seal 3 to respond to movement of the shaft caused by the misalignment of the shaft 1. The pressurized sealing fluid escapes past the close clearance formed between the shaft 1 and labyrinth seal 3 having throttle 26. The close proximity of the throttle 26 to the shaft 1 also creates resistance to the sealing fluid flow over the shaft 1 and causes pressure to build-up inside the annular groove 23. Floating annular groove 27 in cooperation and connection with annular groove 23 also provides an outlet for excess sealing fluid to be "bled" out of shaft seal assembly 25 for pressure equalization or to maintain a continuous fluid purge on the shaft sealing assembly 25 during operation. An advantage afforded by this aspect of the shaft sealing assembly 25 is its application wherein "clean-in place" product seal decontamination procedures are preferred or required. Examples would include food grade applications.

FIG. 7 illustrates shaft seal assembly 25 with the anti-rotation pin 12 removed to improve visualization of the inlets. These would typically exist, but are not limited to, a series of ports, inlets or passages about the circumference of the shaft seal assembly 25. FIG. 7 also shows the shape and pattern of the labyrinth seal 3 may be varied. The shape of throttles 26 may also be varied as shown by the square profile shown at throttle groove 22 in addition to the circular-type 26. Also note that where direct contact with the shaft 1 is not desired, the shaft seal assembly 25 be used in combination with a separate sleeve 24 that would be attached by varied means to the shaft 1.

Figure 8:
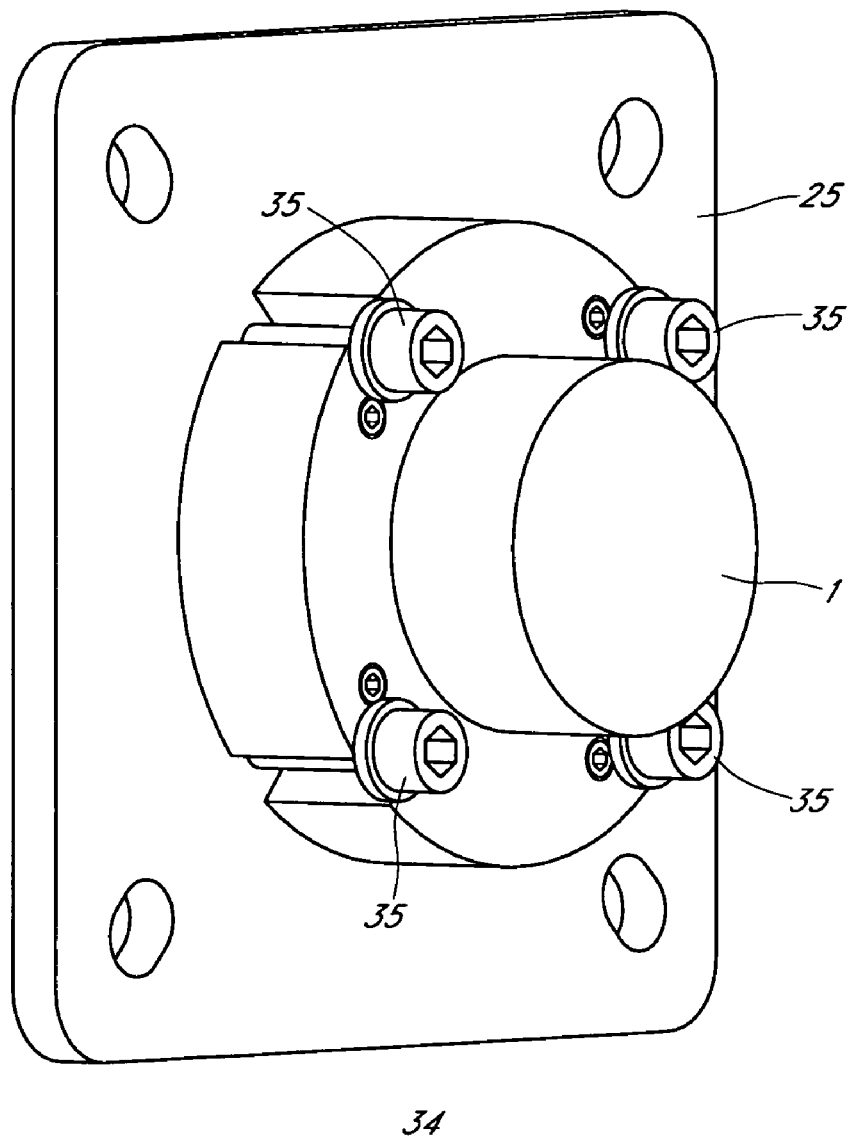
FIG. 8 is a perspective view of a fourth embodiment as mounted to a vessel wall.

FIG. 8 shows that another embodiment of the present disclosure wherein the shaft seal assembly 25 has been affixed to a vessel wall 34. The shaft seal assembly 25 may be affixed to vessel wall 34 through securement means such as mounting bolts 33 to ensure improved sealing wherein shaft 1 is subjected to angular misalignment. The mounting bolts 33 and slots (not numbered) through the shaft seal assembly 25 exterior are one means of mounting the shaft seal assembly 25, as recited in the claims.

Having described the preferred embodiment, other features of the present invention will undoubtedly occur to those versed in the art, as will numerous modifications and alterations in the embodiments of the invention illustrated, all of which may be achieved without departing from the spirit and scope of the invention.

What is claimed:

1. A shaft seal assembly comprising:
   a. a fixed stator, wherein said fixed stator is secured within a housing, and wherein said fixed stator is formed with an annular groove along the radial-interior surface thereof;
   b. a shaft sealing member, wherein said shaft sealing member fits within said annular groove of said fixed stator, and wherein said shaft sealing member comprises:
      i. a floating stator, wherein the radial-exterior surface of said floating stator is separated from said annular groove in said fixed stator in the radial dimension, and wherein the radial-interior surface of said floating stator is substantially concave in shape; and,
      ii. a labyrinth seal, wherein said labyrinth seal has a radial-exterior surface with a substantially convex shape that corresponds to the radial-interior surface of said floating stator so as to create a spherical interface, wherein said labyrinth seal has a radial-interior surface with a plurality of labyrinth pattern annular grooves, and wherein said labyrinth seal radial-interior surface is positioned adjacent a rotatable shaft.

2. The shaft seal assembly according to claim 1 wherein the radial-exterior surface of said floating stator is non-linear.

3. The shaft seal assembly according to claim 1 wherein said floating stator is axially located through a first and second radially oriented interface between said floating stator and said annular groove of said fixed stator.

4. The shaft seal assembly according to claim 3 further comprising a first and second O-ring channel fashioned in said fixed stator at said first and second radially oriented interfaces, respectively, wherein one O-ring is positioned in each said first and second O-ring channel.

5. The shaft seal assembly according to claim 1 wherein a plurality of radially oriented anti-rotation grooves are fashioned in said labyrinth seal, and wherein a plurality of corresponding anti-rotation pins are positioned within said anti-rotation grooves and within a portion of said floating stator adjacent said anti-rotation grooves in said labyrinth seal.

6. The shaft seal assembly according to claim 1 wherein a plurality of axially oriented anti-rotation grooves are fashioned in said fixed stator, and wherein a plurality of corresponding anti-rotation pins are positioned within said anti-rotation grooves and within a portion of said floating stator adjacent said anti-rotation grooves in said fixed stator.

7. The shaft seal assembly according to claim 1 further comprising a plurality of O-ring channels fashioned in the radial-interior surface of said floating stator, wherein one O-ring is positioned in each said O-ring channel.

8. The shaft seal assembly according to claim 1 further comprising a plurality of O-ring channels fashioned in the radial-interior surface of said floating stator, wherein one O-ring is positioned in each said O-ring channel.

9. The shaft seal assembly according to claim 1 further comprising a first fluid return pathway fashioned in said labyrinth seal, a second fluid return pathway fashioned in said floating stator, and a third fluid return pathway fashioned in said fixed stator, wherein said first, second, and third fluid return pathways are in fluid communication with one another.

10. The shaft seal assembly according to claim 1 wherein said floating stator is further defined as being constructed to two distinct portions affixed to one another.

11. The shaft seal assembly according to claim 1 wherein said fixed stator is further defined as being constructed of two distinct portions affixed to one another.

12. The shaft seal assembly according to claim 1 further comprising a vent formed in said fixed stator, wherein said vent fluidly connects the exterior of said fixed stator with said annular groove formed in said fixed stator.

13. The shaft seal assembly according to claim 1 wherein said fixed stator is further defined as being secured to a housing via a portion of the radial-exterior surface of said fixed stator and a corresponding radial-interior surface of an aperture formed in said housing.

14. The shaft seal assembly according to claim 1 wherein said fixed stator is further defined as being secured to a housing via a plurality of mounting bolts passing through a corresponding plurality of apertures in said fixed stator and terminating in a corresponding plurality of bolt holes in said housing.

15. the shaft seal assembly according to claim 1 further comprising:
   a. an annular seal fluid groove fashioned in the radial-interior surface of said labyrinth seal;
   b. a seal fluid inlet fashioned in the radial-exterior surface of said fixed stator;
   c. a first passage fashioned in said floating stator, wherein said first passage is in fluid communication with said seal fluid inlet;
   d. a first passage fashioned in said labyrinth seal, wherein said first passage in said labyrinth seal is in fluid communication with said first passage in said floating stator and said annular seal fluid groove;
   e. a seal fluid outlet fashioned in the radial-exterior surface of said fixed stator;
   f. a second passage fashioned in said floating stator, wherein said second passage is in fluid communication with said seal fluid outlet; and
   g. a second passage fashioned in said labyrinth seal, wherein said second passage in said labyrinth seal is in fluid communication with said second passage in said floating stator and said annular seal fluid groove.

16. The shaft seal assembly according to claim 15 further comprising an alignment skate positioned in each said annular groove of said plurality of labyrinth pattern annular grooves.

17. The shaft seal assembly according to claim 16 wherein said alignment skates are further defined as having the required dimension to contact said rotatable shaft.

18. The shaft seal assembly according to claim 17 wherein said shaft seal assembly is further defined as including a pressurized seal fluid introduced into said shaft seal assembly through said seal fluid inlet.

19. The shaft seal assembly according to claim 18 wherein said pressurized seal fluid is further defined as a gas.

20. The shaft seal assembly according to claim 18 wherein said pressurized seal fluid is further defined as a liquid.

21. The shaft seal assembly according to claim 19 wherein said shaft seal assembly is further defined so that the clearance between said plurality of labyrinth pattern annular grooves in said labyrinth seal and said rotatable shaft is such that a predetermined amount of said pressurized seal fluid may pass between said plurality of labyrinth pattern annular grooves and said rotatable shaft.

22. The shaft seal assembly according to claim 20 wherein said shaft seal assembly is further defined so that the clearance between said plurality of labyrinth pattern annular grooves in said labyrinth seal and said rotatable shaft is such that a predetermined amount of said pressurized seal fluid may pass between said plurality of labyrinth pattern annular grooves and said rotatable shaft.

23. The shaft seal assembly according to claim 21 wherein said seal fluid outlet is further defined as including a purge stream for said pressurized sealing fluid.

24. The shaft seal assembly according to claim 22 wherein said seal fluid outlet is further defined as including a purge stream for said pressurized sealing fluid.

* * * * *